US006690097B2

United States Patent
Pierrot

(10) Patent No.: US 6,690,097 B2
(45) Date of Patent: Feb. 10, 2004

(54) ELECTRIC POWER TRANSMISSION AND DISTRIBUTION SYSTEM

(75) Inventor: Henri Pierrot, Dijon (FR)

(73) Assignee: Schneider Electric Industries SA, Rueil-Malmaison (FR)

( * ) Notice: Subject to any disclaimer, the term of this patent is extended or adjusted under 35 U.S.C. 154(b) by 303 days.

(21) Appl. No.: 09/846,278

(22) Filed: May 2, 2001

(65) Prior Publication Data

US 2001/0039133 A1 Nov. 8, 2001

(30) Foreign Application Priority Data

May 4, 2000 (FR) .......................................... 00 05837

(51) Int. Cl.$^7$ ................................................ H02B 1/20
(52) U.S. Cl. ........................ 307/42; 439/212; 174/72 B
(58) Field of Search ............................ 307/42; 439/212, 439/213; 174/68.2, 70 B, 71 B, 72 B, 88 B, 88 R, 99 B, 84 R, 85, 86

(56) References Cited

U.S. PATENT DOCUMENTS

| | | | |
|---|---|---|---|
| 3,376,377 A | | 4/1968 | Fehr, Jr. |
| 3,732,523 A | * | 5/1973 | Fouse et al. ............... 174/71 B |
| 3,742,121 A | * | 6/1973 | Schmidt ..................... 174/72 B |
| 3,818,417 A | * | 6/1974 | Koenig et al. ............... 439/213 |
| 4,009,920 A | * | 3/1977 | Hicks et al. ................ 439/213 |
| 4,097,103 A | * | 6/1978 | Krause ........................ 439/213 |
| 4,146,285 A | * | 3/1979 | Cook ........................ 174/88 B |
| 4,183,608 A | * | 1/1980 | Nicholls ...................... 439/622 |
| 4,705,334 A | * | 11/1987 | Slicer et al. ................. 174/68.2 |
| 4,714,431 A | * | 12/1987 | McGoldrick et al. ........ 439/212 |
| 4,739,441 A | * | 4/1988 | Galletly ....................... 174/68.2 |
| 4,820,178 A | * | 4/1989 | Anderson et al. ............ 439/212 |
| 5,192,217 A | * | 3/1993 | Wittmer ....................... 439/211 |
| 5,383,090 A | * | 1/1995 | Freundner et al. .......... 174/68.2 |
| 5,415,557 A | * | 5/1995 | Chapman et al. ............ 439/114 |
| 5,760,339 A | * | 6/1998 | Faulkner et al. ........... 174/88 B |
| 6,142,807 A | * | 11/2000 | Faulkner ..................... 439/212 |
| 6,176,720 B1 | * | 1/2001 | Johnson ...................... 439/213 |
| 6,399,882 B1 | * | 6/2002 | Faulkner et al. .......... 174/99 B |
| 6,521,837 B2 | * | 2/2003 | Hilgert et al. ............. 174/99 B |

FOREIGN PATENT DOCUMENTS

FR 2 694 845 2/1994

\* cited by examiner

Primary Examiner—Brian Sircus
Assistant Examiner—Roberto J. Rios
(74) Attorney, Agent, or Firm—Oblon, Spivak, McClelland, Maier & Neustad, P.C.

(57) ABSTRACT

The present invention concerns an electric power transmission and distribution system including transmission components each having several parallel, insulated transmission conductors laid against each other, the ends of which are connected by a terminal block fitted with a tap-off device. This system includes at least one distribution component, having parallel distribution conductors spaced apart from each other, and one at least of the two ends of which is connected to a tap-off device, with no additional means of electrical protection against current overloads. The cross-section of the distribution conductors is smaller than the cross-section of the transmission conductors.

10 Claims, 3 Drawing Sheets

X-X

ELECTRIC POWER TRANSMISSION AND DISTRIBUTION SYSTEM

The present invention concerns a low voltage electric power transmission and distribution system, such as prefabricated electrical trunking, including transmission components constituted by several parallel, insulated conductors laid against each other, associated with distribution components, constituted by several parallel conductors spaced apart from each other.

BACKGROUND OF THE INVENTION

Systems for transmitting and distributing electric power by prefabricated electrical trunking are well known. Their function is on the one hand to transmit electric power from one position to another within an installation, for example from one electrical control board to another electrical control board, and on the other to distribute this electric power in respect of the different receivers spread in location within this installation, by offering fixed connection points at close intervals all along the trunking, for example of the order of one or two connection points per meter. The receivers are then supplied by means of tap-off junctions at these connection points. Moreover requests are often made for a tap-off junction to be installed or removed easily without cutting off the electricity supply in the trunking according to a type of connection known hereinafter as a "plug-in".

There is a first technology for manufacturing such prefabricated electrical trunking wherein the conductive trunking bars are parallel to, insulated from and laid against each other within a metal sheath. This first technology allows the reactance of the prefabricated electrical trunking to be reduced and brings a better thermal exchange with the outside particularly for strong currents, such as those above 1000A. In a second technology, the conductive bars are parallel but spaced apart from each other in the sheath. This second technology increases the reactance of the electrical trunking and renders the thermal exchange with the outside less effective, but it does make it much easier to install and remove tap-off junctions according to a "plug-in" type connection. The first technology is therefore well adapted for the electric power transmission function whereas the second technology is better adapted to the electric power distribution function.

One solution therefore consists in using conductive bars which are insulated from and laid against each other but open out at regular and close intervals to offer "plug-in" type connections. However, in this solution, outward heat dissipation becomes less efficient and the cost of such trunking goes up fast when the power is high particularly given the difficulty in insulating and folding large conductive bars at close intervals. In the solution disclosed in U.S. Pat. No. 4,886,468, electrical trunking is constituted by insulated conductive bars, laid against each other and having at regular intervals conductive outgrowths, transverse to the longitudinal axis of the bars and separate from each other so as to allow a connection in respect of "plug-in" type tap-off junctions. Heat dissipation along the trunking occurs effectively since the bars remain laid against each other but such a system remains complex to manufacture and insulate. Moreover by reason of their construction, these solutions systematically offer connection points over the whole length of the trunking even in areas of the installation where the user has no tap-off junction to install, which may provide him with points far in excess of his real need.

BRIEF SUMMARY OF THE INVENTION

The purpose of the invention is therefore to propose an electric power transmission and distribution system having concurrently the technical and economic advantages of both technologies and therefore providing on the one hand the transmission function with low circuit impedance, small losses and good heat dissipation and on the other hand the distribution function with "plug-in" type connection possibilities, while optimising the number of these connection possibilities as a function of the real needs of the user.

To this end, the invention describes an electric power transmission and distribution system including several transmission components, each having several parallel, insulated transmission conductors laid against each other, each end of these transmission components having an opening out of the transmission conductors to connect two adjacent transmission components by means of a terminal block, and including at least one distribution component having several parallel distribution conductors spaced apart from each other, one at least of the two ends of which is directly connected to a transmission component by a tap-off device at terminal block level, with no additional means of electrical protection against current overloads.

The cross-section of the distribution conductors is smaller than the cross-section of the transmission conductors. A limited number of tap-off points, spaced out at intervals, are provided along the distribution components, allowing tap-off junctions to be installed by "plug-in" type connections. The total current consumption of receivers connected to the tap-off junctions of a distribution component may be greater than the rated current running uniformly through the length of a distribution component.

BRIEF DESCRIPTION OF THE SEVERAL VIEWS OF THE DRAWINGS

Other characteristics and advantages will emerge in the following detailed description referring to an embodiment given by way of example and shown in the appended drawings wherein.

DETAILED DESCRIPTION OF THE INVENTION

Figure 1:
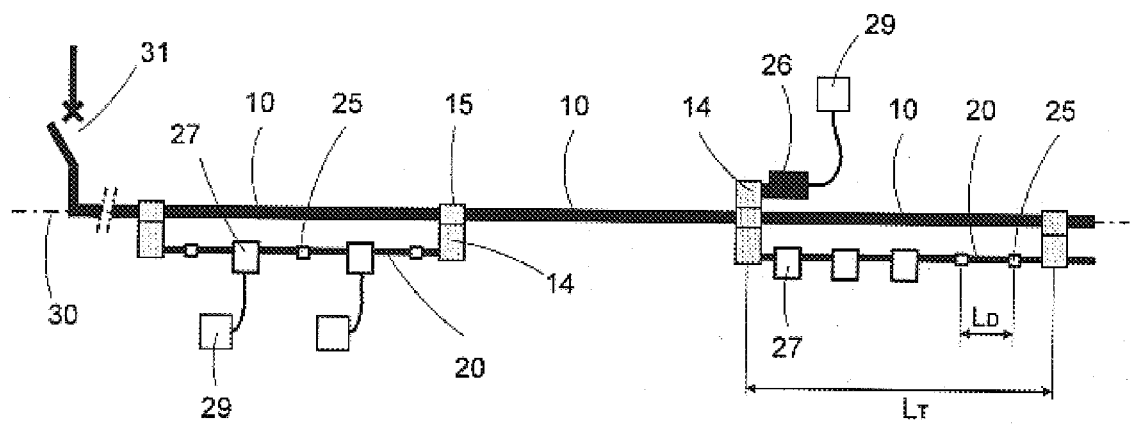
FIG. 1 shows an example of a general circuit diagram for a system according to the invention comprising three transmission components, a tap-off unit and two distribution components connected at their ends, FIG. 2 gives details of an embodiment of a terminal block connecting two transmission components equipped with three conductors.

In FIG. 1, the electric power transmission and distribution system includes several transmission components 10, such as prefabricated electrical trunking components. Each transmission component 10 is of a set length $L_T$, for example equal to five meters, and encloses, in a rigid tubular sheath, several transmission conductors 11, which may be metal bars or cables, parallel to and insulated from each other and laid against each other. These transmission components 10 have at their ends 12 an opening out of the transmission conductors 11 allowing them to be fitted together by abutment by means of a terminal block 15. This terminal block 15 provides the electrical connection by jointing in twos the different respective conductors 11 of two adjacent transmission components 10. Each terminal block 15 may also incorporate at least one tap-off device 14, so as to provide the junction between two transmission components and the tap-off from distribution components.

The electric power transmission and distribution system also comprises one or more distribution components 20,20', which may be prefabricated electrical trunking components, and which enclose, in a rigid tubular sheath, several distribution conductors 21, for example metal bars or cables, parallel to and spaced apart from each other. These distribution components 20,20' are mounted as a tap-off from the transmission components 10, each distribution component having at least one of its ends 22 directly connected to a tap-off device 14 at terminal block 15 level.

FIG. 1 shows distribution components 20 connected by their two ends 22 to tap-off devices 14. In this case, for obvious reasons of construction, a distribution component 20 is preferentially parallel to a transmission component 10.

Figure 5:
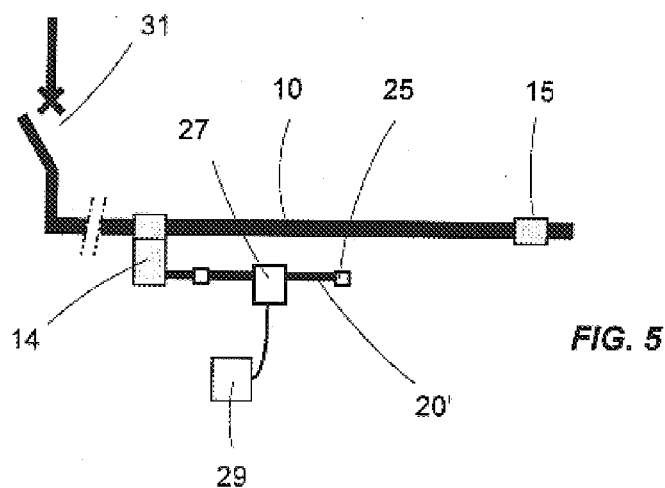
FIG. 5 shows the circuit diagram for a system including a distribution component connected by only one of its ends.

FIG. 5 shows a distribution component 20' connected by only one of its ends 22 to a tap-off device 14. In this case, the distribution component 20' is equally well either oriented parallel to a transmission component 10, as shown in FIG. 5, or oriented along another direction, for example perpendicularly to a transmission component 10.

Each distribution component 20,20' has in a distributed way, at intervals $L_D$ which may or may not be regular, for example intervals less than or equal to one meter, a limited number of connection points called tap-off points 25 enabling tap-off junctions 27 to be installed by "plug-in" type connections, in other words a connection allowing a tap-off junction 27 to be installed or removed without cutting off the electricity supply to the transmission and distribution system. This type of connection is known and present in numerous distribution components, of the prefabricated electrical trunking type and its embodiment will not be given in detail here. The interval $L_D$ between two adjacent tap-off points 25 is less than the length $L_T$ of the transmission components 10.

Tap-off junctions 27 serve to feed receivers 29 located downstream. These may thus be distributed to advantage over the whole length of a distribution component 20,20' for a better current consumption distribution. Moreover, it is easy to modify the layout of the receivers 29 connected to the tap-off junctions 27, to add or to remove some tap-off junctions without stopping the operation of the other receivers.

Furthermore, when a user wishes to install a high power receiver 29, for example of power greater than or equal to the gauge of a distribution component, or when he has only one receiver to install over the whole length of a transmission component 10, he retains the possibility of connecting this receiver 29 by means of a simple tap-off unit 26 connected to a tap-off device 14, as shown in FIG. 1, this connection being made in a fixed way and without voltage. The tap-off unit 26 includes its own usual means of electrical protection against current overloads.

Figure 2:
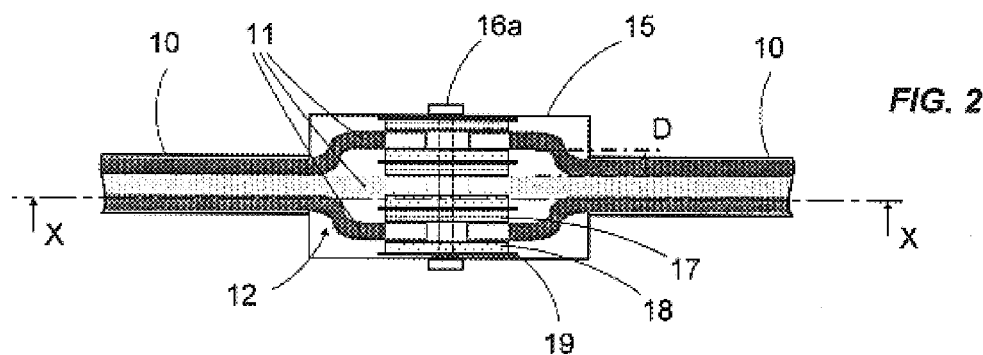

In a first embodiment shown in FIG. 2, the transmission components comprise three transmission conductors 11 which open out at each of their ends 12 to facilitate jointing at the terminal block 15. This opening out generates a distance D between two adjacent conductors 11. Preferably, the value of this distance D is selected so as to be approximately equal to the existing gap between the conductors 21 of the distribution components 20,20' with the aim of simplifying the tap-off device 14. The terminal block includes in a casing 15 several pairs of conductive plates 17,18, each pair surrounding the bare ends of a transmission conductor 11 and a corresponding distribution conductor 21. Insulation between two pairs of conductive plates 17,18 on the one hand and between the conductive plates 17,18 and the casing 15 on the other hand, is provided by an appropriate insulation device 19.

Figure 3:
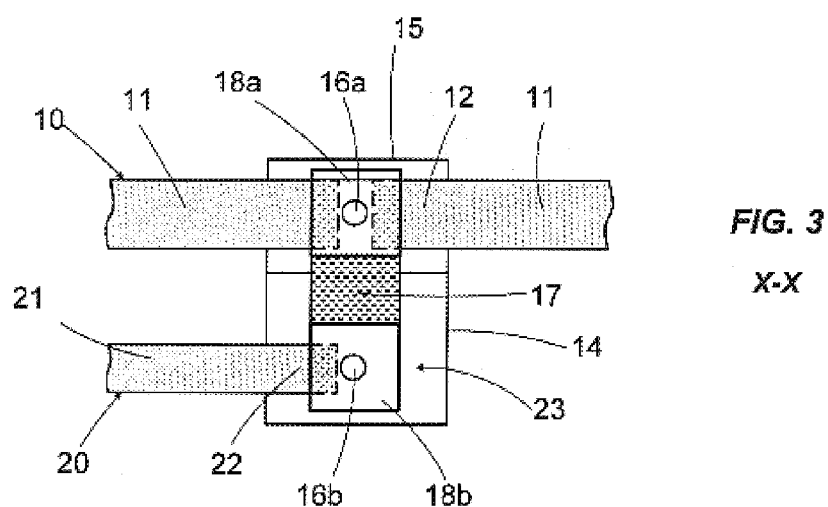
FIG. 3 shows a cross-section view of the terminal block in FIG. 2 along an axis X—X.

With reference to FIG. 3, the first conductive plates 17 and the insulation devices 19 of the terminal block 15 are extended so as to form a tap-off device 14 incorporated into the terminal block. The first conductive plates 17 provide the electrical connection between a transmission conductor 11 and a corresponding distribution conductor 21. The second conductive plates 18 are constituted by two different half-plates 18a, 18b, the half-plate 18a providing the fixing and electrical connection of the transmission conductors 11 and the half-plate 18b providing the fixing and electrical connection of the distribution conductors 21. Such a tap-off device 14 thus offers two available tap-off locations 23, each location being able to receive the end 22 of a distribution component 20,20' as shown in FIG. 3, but also a tap-off unit 26. Furthermore, it is possible to add another tap-off device 14 at terminal block 15 level along a direction perpendicular to the longitudinal axis 30 of the transmission components 10, by extending the plates 17 in this direction. A terminal block 15 may then comprise two tap-off devices 14 located on either side of this longitudinal axis 30 as shown in FIG. 1.

The terminal block 15 and tap-off device 14 unit is tightened by tightening means, constituted for example by several tightening screws 16a, 16b with spring washers, sufficient to provide a good electrical connection between the conductors 11, the conductive plates 17, 18a, 18b and the conductors 21. Thus in this first embodiment, the conductive plates 17, 18a, 18b may to advantage make simultaneously one or more tap-off devices 14 as well as a jointing unit between two adjacent transmission components 10. However, this embodiment offers less flexibility for the installation of tap-off outlets, since these are either made at the time of jointing between transmission components 10 or necessitate operating on the transmission components 10.

Figure 8:
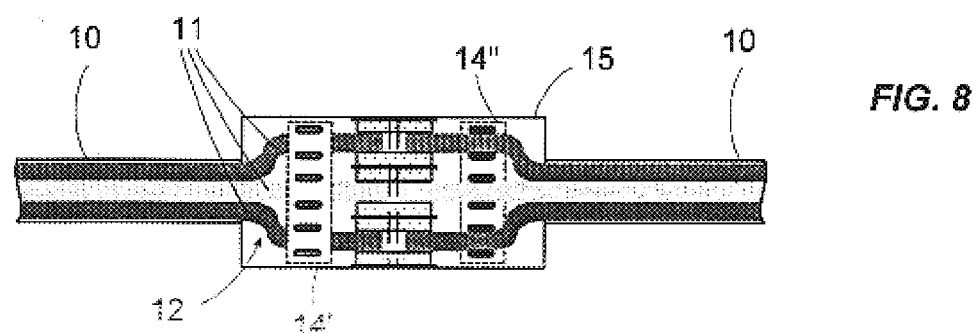
FIG. 8 shows another embodiment of a terminal block.

According to another embodiment shown in FIG. 8, a terminal block 15 comprises separately a jointing between two transmission components 10 and one or more tap-off components 14. In this embodiment, the tap-off devices 14 are constituted, for example, by tap-off points according to a known model possibly allowing connections of the "plug-in" type. FIG. 8 shows an example in which a terminal block 15 comprises, in addition to a jointing unit, a first tap-off point 14' pointing in one direction and a second tap-off point 14" pointing in the opposite direction. The tap-off points 14',14" may receive distribution components 20,20' but also tap-off units 26.

In this way, thanks to this embodiment, the distribution components 20 may be installed or removed without intervention on the transmission components 10, which simplifies the installation of the system described in the invention. Moreover, this solution makes it possible to use standard jointing units and "plug-in" type tap-off connections. It nonetheless requires the opening out to be made over a greater length at the ends of the transmission conductors 11. This opening out of the transmission conductors 11 generates a distance D between two adjacent conductors 11. The value of this distance D is selected so as to be approximately equal to the gap existing between the conductors 21 of the distribution components 20,20', so as to make it possible to use tap-off points 14',14".

It is clear that the transmission 10 and distribution 20 components may, in an equivalent way, comprise a number of transmission 11 and distribution 21 conductors which is different from three (in particular four conductors to convey three phases and one neutral one).

The electricity supply for such a transmission and distribution system is provided by an external power supply (for example a transformer) not shown and connected to one end of one of the transmission components 10, with adapted protection means 31.

Prefabricated electrical trunking is characterised by different parameters such as:
- the rated current $I_N$,
- the overall resistance R of the conductors,
    - the reactance X of the conductors for a given frequency of use,
- the impedance $Z=\sqrt{(R^2+X^2)}$ The resistance R represents total electrical losses $P_T$ dissipated in the trunking. This resistance R is deduced by calculation from a measurement of these total losses according to the formula: $R=P_T/I_N^2$.

In alternating current, the total electrical losses $P_T$ in the trunking conductors include not only the losses associated with the pure resistance of the conductors, a function of the resistivity of the material employed and corrected for skin effects and proximity effects to which the conductors are subject, but also particularly losses associated with variations in induction B inducing hysteresis losses in the metal sheath and eddy current losses in the conductive materials. All of these losses vary markedly depending on whether a technology is used with conductors laid against each other or conductors spaced apart from each other. It may thus be noted that conductor resistance, reactance and therefore impedance is much lower in the technology where conductors are laid against each other than in the technology with spaced apart conductors. For this reason, the transmission components 10, whose conductors are laid against each other, generate overall fewer electrical losses than the distribution components 20,20', whose conductors are spaced apart. The same goes for on line voltage drops and this is particularly true when the power factor of the installation is low. Moreover, it has already been pointed out at the beginning of the disclosure that the technology with conductors laid against each other enables better outward heat dissipation.

Figure 6:
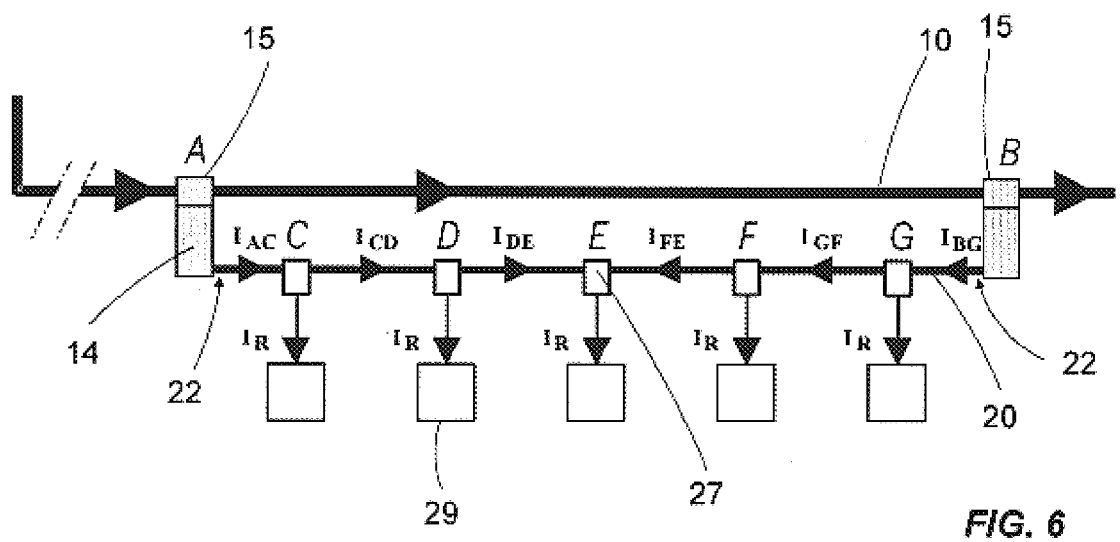
FIGS. 6 and 7 show the distribution of currents in a system according to the invention.
Figure 7:
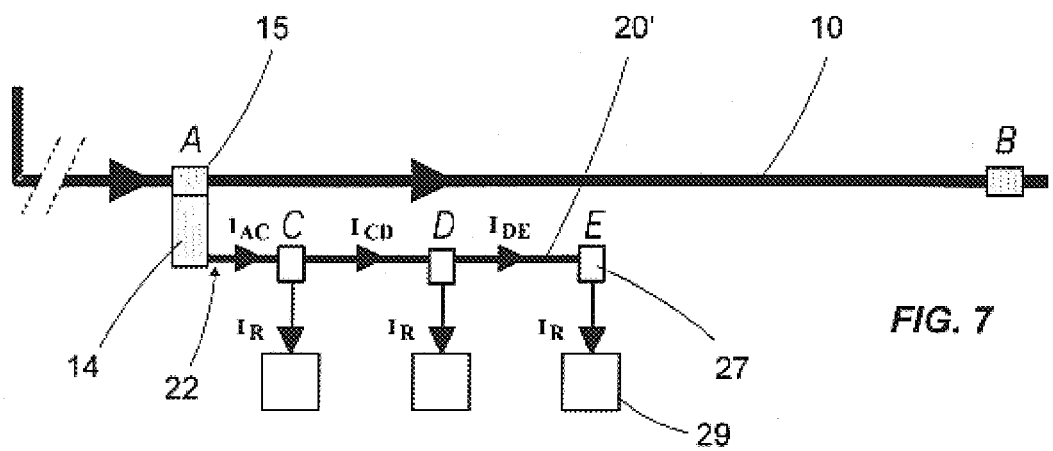

FIGS. 6 and 7 will allow, as an illustration, a better understanding of current distribution in the distribution components 20,20'. In FIG. 6, a distribution component 20 is connected by its two ends to points A and B of a transmission component 10, via two terminal blocks 15 each comprising a tap-off device 14. The distribution component 20 feeds five receivers 29 presumed identical in this example and each consuming a current $I_R$. The five receivers 29 are connected to connection points C, D, E, F and G, corresponding to tap-off junctions 27 distributed over the component 20. In FIG. 7, a distribution component 20' is connected by only one of its two ends to the point A of a transmission component 10, via a tap-off device 14. The distribution component 20' feeds three receivers 29 presumed identical in this example and each consuming a current $I_R$. The three receivers 29 are connected to connection points C,D and E, corresponding to tap-off junctions 27 distributed over the component 20'.

When a distribution component 20 of resistance R is passed through uniformly by a rated current $I_N$, authorised total losses $P_T$ are equal to $R*I_N^2$. When such a rated current $I_N$ passes uniformly through a distribution component, it corresponds to a rise in temperature bringing this distribution component 20 to an authorised operational temperature limit denoted θ.

The impedance of a distribution component 20 is much higher than the impedance of a transmission component 10 since on the one hand the transmission components 10 use technology with conductors laid against each other and on the other hand the cross-section of the conductors 21 of a distribution component 20 is smaller than the cross-section of the conductors 11 of a transmission component 10. Thus when a distribution component 20 is mounted as a tap-off from a transmission component 10 as shown in FIG. 6 and given that there is practically no voltage drop between A and B, the distribution component 20 is therefore passed through mainly by the current corresponding to the receivers 29 which are connected to it. Moreover, as the distribution component 20 is connected at its two ends, this current is distributed on either side of the distribution component 20. Thus the current $I_R$ consumed by the receiver 29 connected at point E comes in an approximately identical way from the sections DE and FE. Therefore the current $I_{DE}$, circulating in the section located between the points D and E, is identical to the current $IF_E$ circulating between the points F and E, and is equal to: $I_R/2$. Likewise, the current $I_{CD}$ circulating between the points C and D, is identical to the current $I_{GF}$, circulating between the points G and F, and is equal to $I_R+I_{DE}$, i.e.: $3/2*I_R$. Likewise, the current $I_{AC}$ circulating between the points A and C, is identical to the current IBG/circulating between the points B and G, and is equal to $I_R+I_{CD}$, i.e.: $5/2*I_R$. It can thus be seen that the resulting losses are different in each of the sections of the distribution component 20.

However, given the good thermal conductivity of the conductors used (copper or aluminium), it may be supposed that the temperature remains approximately uniform over the whole of the distribution component 20. For this reason, a maximum current consumption can be set at $I_M=\Sigma I_R$ ($=5*I_R$ in the example), calculated so as not to exceed the authorised operational temperature limit θ, corresponding to total losses $P_T$. Supposing a regular distribution of the five connection points C, D, E, F, G along the distribution component 20, a maximum value $I_M$ is then obtained of the order of: $3.2*I_N$.

In the example in FIG. 7, the reasoning is identical. The distribution component 20' is passed through only by the current corresponding to the three receivers 29 which are connected to it. Thus, the current $I_{DE}$ circulating between the points D and E, is equal to: $I_R$. Likewise, the current $I_{CD}$, circulating between the points C and D, is equal to $I_R+I_{DE}$, i.e.: $2*I_R$, and the current $I_{AC}$, circulating between the points A and C, is equal to $I_R+I_{CD}$, i.e.: $3*I_R$. The resulting losses are in this case too very different in each section of the distribution component 20'. Given the good thermal conductivity of the conductors used (copper and aluminium), it may be supposed that the temperature remains approximately uniform over the whole of the distribution component 20'. For this reason, a maximum current consumption may be set at $I_M=\Sigma I_R$ ($=3*I_R$ in the example), calculated so as not to exceed the authorised operational temperature limit θ, corresponding to total losses $P_T$. Supposing a regular distribution of the three connection points C, D, E along the distribution component 20', a maximum value $I_M$ is then obtained of the order of: $1.5*I_N$.

Consequently, in the two examples, it is acceptable for the total current consumption of the receivers 29 connected to a distribution component 20,20' to be much higher than the rated current $I_N$ which would be acceptable over the whole length of this distribution component 20,20', without exceeding the authorised operational temperature limit θ. This is obtained on the one hand thanks to the different technologies employed for the transmission 10 and distribution 20,20' components, and on the other hand thanks to a reduction in the number and gauge of the tap-off junctions 27 and to a distribution of these junctions along a transmission component 20,20'. The advantage is to give the user the opportunity of optimising to advantage the gauge of his distribution components 20, 20' relative to downstream current consumption. Thus, in a system according to the invention, a distribution component 20 of rated current $I_N$ equal to 630A may feed up to five distributed receivers 29 each consuming 400A, if it is connected at its two ends to a transmission component 10. Likewise a distribution component 20' of rated current $I_N$ equal to 500A and connected at one end only, may feed up to three distributed receivers 29 each consuming 250A.

The reduction in the number of tap-off junctions 27 is obtained through construction by reducing the number of tap-off points 25 built into a distribution component 20,20' and the reduction in the gauge of the tap-off junctions 27 able to be installed on these tap-off points 25 is obtained for example by means of a conventional mechanical mounting polarisation preventing the connection of unauthorised tap-off junctions 27.

The result is that in an installation having a system as described in the present invention, in other words constituted by one or more distribution components 20,20' mounted as a tap-off from transmission components 10, the greater part of the line current passes through the transmission components 10. Moreover, although the cross-section of the distribution conductors 21 is smaller than the cross-section of the transmission conductors 11, it is not necessary to add electrical protection means against current overloads between the transmission components 10 and the distribution components 20,20'.

In this way an electric power transmission and distribution system is obtained which is high performance and straightforward since on the one hand the electric power transmission function is optimised by using standard transmission components 10 with conductors laid against each other and therefore favouring thermal exchanges with the outside and reducing overall losses, and on the other hand the electric power distribution function is simplified by using standard distribution components 20,20' with spaced apart conductors facilitating "plug-in" type connections for the tap-off junctions 27.

For the user, the procedure to adopt in order to install such a transmission and distribution system may, for example, be as follows: firstly energise the surface to be supplied in other words install the transmission components 10 along buildings, then, depending on actual need, install in a distributed way the distribution components 20,20' and/or the tap-off units 26 only in the operational zones of buildings thus optimising the overall cost of the installation.

Figure 4:
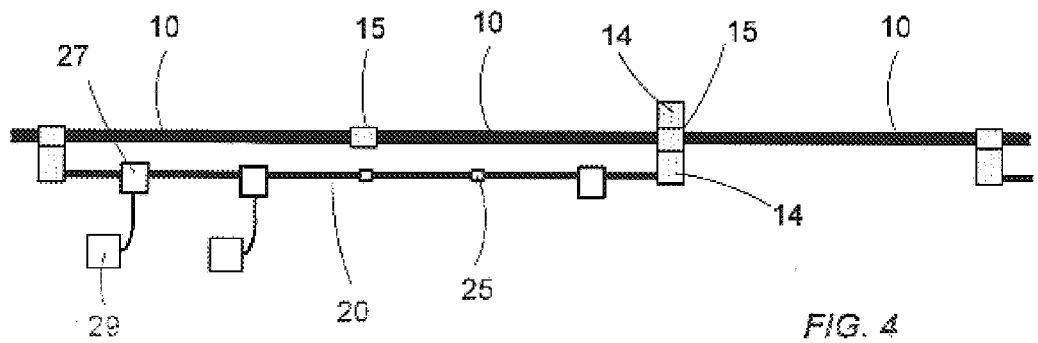
FIG. 4 shows another example of a circuit diagram for a system according to the invention.

Finally, for transmission components 10 of length $L_T$, distribution components 20 are conceivable connected at their two ends 22 to a tap-off device 14, of a length either equal to $L_T$ according to a preferred embodiment, or equal to a multiple of $L_T$, for example $2*L_T$ as shown in FIG. 4. On the other hand, the distribution components 20', which are connected only at one end 22, are preferentially of a length of the order of $L_T/2$.

It is of course understood that, without departing from the context of the invention, other alternatives and improvements in detail are conceivable and even the use of equivalent means may be considered.

What is claimed is:

1. An electric power transmission and distribution system comprising:
   a plurality of transmission components (10) of length ($L_T$), each having parallel, insulated transmission conductors (11) laid against each other therein, each end of these transmission components (10) having an opening out (12) of the transmission conductors (11) to connect two adjacent transmission components (10) by means of a terminal block (15),
   at least one distribution component (20,20') having parallel distribution conductors (21) spaced apart from each other, one at least of the two ends (22) of which is directly connected to a transmission component (10) by a tap-off device (14) at terminal block (15) level, with no additional means of electrical protection against current overloads, the cross-section of the distribution conductors (21) being smaller than the cross-section of the transmission conductors (11),
   wherein a number of tap-off points (25), spaced out at intervals ($L_D$), are provided along the distribution components (20,20'), allowing tap-off junctions to be installed by "plug-in" type connections, thereby allowing tap-off junctions (27) to be installed or removed without cutting off the electricity supply in the transmission and distribution system.

2. An electric power transmission and distribution system according to claim 1, wherein the two ends (22) of a distribution component (20) are directly connected by tap-off devices (14) to transmission components (10), with no additional means of electrical protection against current overloads.

3. An electric power transmission and distribution system according to claim 1, wherein only one of the two ends (22) of a distribution component (20') is directly connected by a tap-off device (14) to a transmission component (10), with no additional means of electrical protection against current overloads.

4. An electric power transmission and distribution system according to claim 1, wherein the gap ($L_D$) between two tap-off points (25) is smaller than the length ($L_T$) of a transmission component (10).

5. An electric power transmission and distribution system according to claim 1, wherein the total current consumption of receivers (29) connected to tap-off junctions (27) of a distribution component (20,20') may be greater than the rated current ($I_N$) passing uniformly through the length of a distribution component (20,20').

6. An electric power transmission and distribution system according to any one of the previous claims, wherein a tap-off unit (26), fitted with own electrical protection means, may also be connected to a tap-off device (14) of a transmission component (10).

7. An electric power transmission and distribution system according to claim 1, wherein the opening out at each end (12) between the different transmission conductors (11) of the transmission components (10) is of a value (D) approximate identical to the gap between the distribution conductors (21).

8. An electric power transmission and distribution system according to claim 7, wherein a terminal block (15) comprises conductive plates (17,18a,18b) allowing at least one tap-off device (14) and one jointing unit between two adjacent transmission components (10) to be made simultaneously.

9. An electric power transmission and distribution system according to claim 8, wherein each tap-off device (14) has two available tap-off locations (23), each location being able to receive one end (22) of a distribution component (20,20') or a tap-off unit (26).

10. An electric power transmission and distribution system according claim 1, wherein a terminal block (15) may comprise two tap-off devices (14).

* * * * *